United States Patent
Egerer

(10) Patent No.: US 6,724,240 B2
(45) Date of Patent: Apr. 20, 2004

(54) METHOD AND INTEGRATED CIRCUIT FOR BOOSTING A VOLTAGE

(75) Inventor: Jens Egerer, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/210,665

(22) Filed: Aug. 1, 2002

(65) Prior Publication Data

US 2003/0025550 A1 Feb. 6, 2003

(30) Foreign Application Priority Data

Aug. 1, 2001 (DE) .......................... 101 37 698

(51) Int. Cl.[7] .............................. G05F 1/10; G05F 3/02
(52) U.S. Cl. ........................................ 327/536; 327/589
(58) Field of Search ................................ 327/536, 537, 327/589; 363/59, 60

(56) References Cited

U.S. PATENT DOCUMENTS 5,568,079 A    10/1996   Ohno ........................ 327/349
6,075,402 A  * 6/2000    Ghilardelli et al. ......... 327/536
2002/0190780 A1 * 12/2002 Bloch ........................ 327/536

FOREIGN PATENT DOCUMENTS

DE    WO01/35518 A1 *  5/2001  ............ H02M/3/07

* cited by examiner

*Primary Examiner*—Terry D. Cunningham
*Assistant Examiner*—Quan Tra
(74) *Attorney, Agent, or Firm*—Laurence A. Greenberg; Werner H. Stemer; Ralph E. Locher

(57) ABSTRACT

A method and an integrated circuit for boosting a voltage are disclosed. A two-stage charge pump is used and has switches and capacitors. Known charges pumps can be single-stage or multi-stage and can achieve only a doubling of the input voltage in practice, depending on the configuration of the switches and capacitors and whereby each stage is provided with a separate drive. An improved two-stage charge pump can triple the input voltage and is advantageously achieved. N-type field effect transistors that are embedded in the substrate of an integrated circuit are utilized as the switches. It is further provided that a second series pass transistor is driven at its bulk terminal and/or its gate by a capacitor and a level shifter. This advantageously obviates the need to expand the width of the additional series pass transistor.

9 Claims, 2 Drawing Sheets

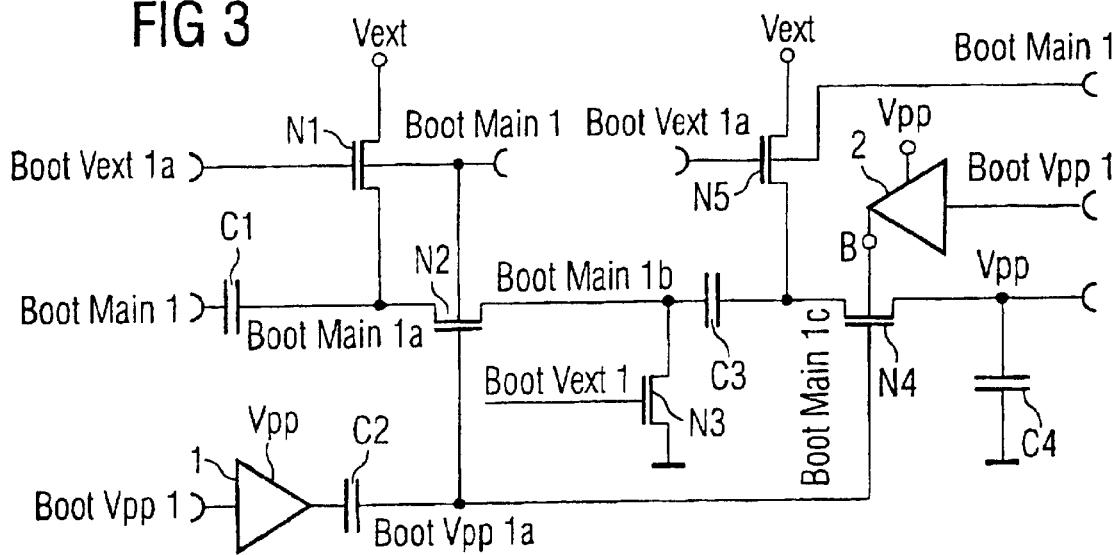
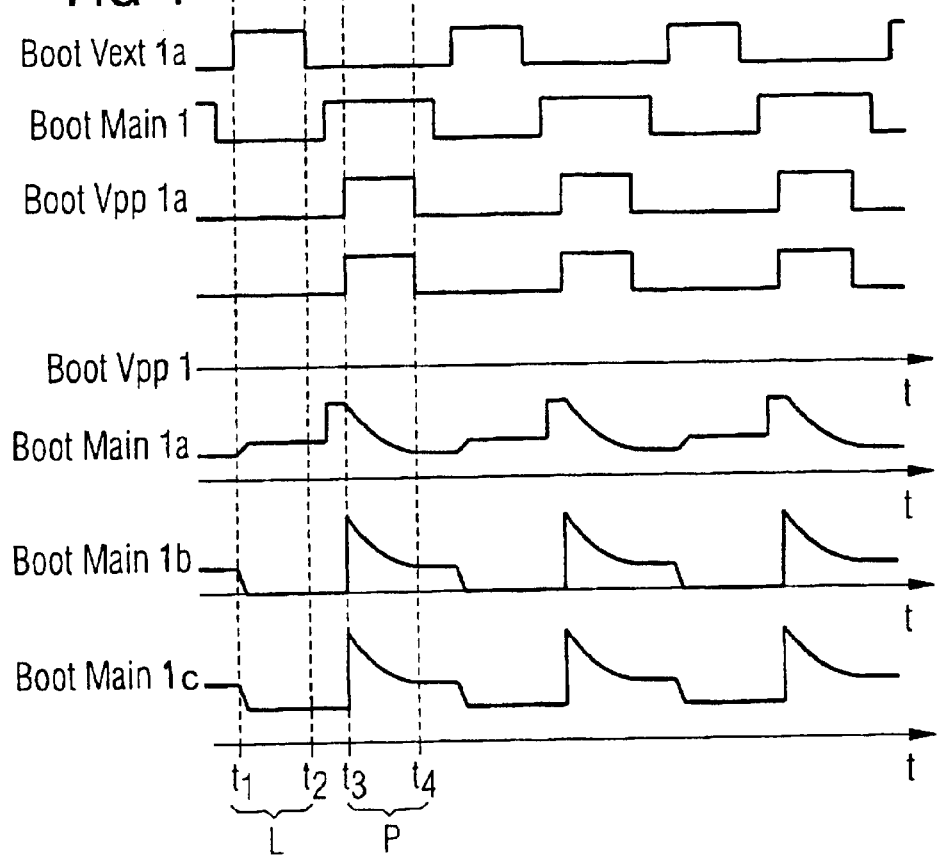

METHOD AND INTEGRATED CIRCUIT FOR BOOSTING A VOLTAGE

BACKGROUND OF THE INVENTION

Field of the Invention

The present invention relates to a method and an integrated circuit for boosting an input voltage with the aid of switches and capacitors.

It is often desirable to construct equipment as small and light as possible, particularly portable electronic devices such as radios, telephones (mobiles), audio devices, dictaphones, hearing aids, watches, cameras, and so on. Several batteries in a device results in an undesirably large space requirement and a high weight. On the other hand, for physical reasons the modules, which are often constructed in the form of an integrated circuit like a memory or an amplifier, must demand a particular minimum voltage in order to guarantee their function. Besides, some integrated circuits need several different operating voltages, which cannot be drawn from a single battery without great expense.

An individual battery cell, which can have 1.2 to 1.5 volts as a rule, depending on the embodiment, often is insufficient for the above-described problem, especially since the battery voltage can drop further as a result of the charge loss of the battery.

This problem has been handled in the past by making the battery configuration smaller and then connecting several smaller batteries in series in order to generate a higher voltage (input voltage). The disadvantage of this is that a relatively large space is still required.

In order to generate a higher voltage from a low voltage, voltage converters with transformers or the like have-been used. But these function only with A.C. voltages and cannot be realized in battery-operated devices without additional outlay.

A pump circuit such as a charge pump is also known, with which the input voltage can be doubled for a reasonable expense. The charge pump is employed particularly in integrated circuits, whereby corresponding capacitors are charged by MOSFET transistors as switching transistors. The disadvantage of a single-step charge pump is that the voltage can be at most doubled.

U.S. Pat. No. 5,568,079 describes a method for boosting an input voltage and a corresponding integrated circuit with a two-stage charge pump. But the disadvantage of the configuration is that the output series pass transistor must have a relatively large width in order to make reliable switching possible.

SUMMARY OF THE INVENTION

It is accordingly an object of the invention to provide a method and an integrated circuit for boosting a voltage that overcome the above-mentioned disadvantages of the prior art devices and methods of this general type, in which it is possible to utilize a small output series pass transistor that is characterized by a high reliability.

With the foregoing and other objects in view there is provided, in accordance with the invention, a method for boosting an input voltage. The method includes impressing the input voltage on a two-stage charge pump during a charging phase resulting in a stored input voltage and transforming the stored input voltage into a boosted output voltage during a pumping phase. The boosted output voltage is charged by way of an output series pass transistor and tapped at an output capacitor. A level shifter of the two-stage charge pump is used for driving a bulk terminal of the output series pass transistor.

According to the invention, for the purpose of boosting the input voltage, the two-stage charge pump is provided with a level shifter with which a bulk terminal of an output series pass transistor is drivable. It is possible to drive the bulk terminal particularly in an isolated NFET transistor, because the bulk terminal is located in a separate trough that is isolated from the substrate. With this layout, it is possible to raise the bulk terminal of the output series pass transistor to the desired pump voltage, so that the output transistor can be switched to low impedance. Furthermore, a high reliability of the output series pass transistor is achieved, because the voltage of the source, drain and gate are reduced relative to the bulk. By driving the bulk terminal, the width of the output series pass transistor is reduced as the bulk effect is reduced.

The advantage of the inventive method for boosting an input voltage and the inventive integrated circuit is that, with the aid of a two-stage charge pump, the input voltage can be boosted to triple its value without further ado. It is particularly advantageous that, with the configuration, the voltage can be easily raised to substantially higher values, for instance to a triple value. When the method is applied to an integrated circuit, in particular, the voltage boost can be achieved without any appreciable additional outlay in the fabrication of the integrated circuit.

It is particularly advantageous that the two-stage charge pump has the same construction and/or utilizes the same drive signals as the single-stage charge pump. The layout associated with the utilization of the two-stage charge pump is thus substantially simplified.

In order to minimize the ON-resistance of the series pass transistor, this is driven with an elevated gate voltage, whereby the gate voltage is expediently selected larger than the source voltage. It is then no longer necessary to enlarge the output series pass transistor.

It is also particularly advantageous that the output voltage is utilized for generating the gate voltage in order to open the output series pass transistor. The gate voltage is raised therein to double the output voltage.

It is also advantageous that in the first phase the two capacitors are charged to the input voltage simultaneously. This is possible because the same drive signals are utilized.

With the chosen two-stage construction of the charge pump, the output voltage can be transformed upward directly to the desired value. In contrast, with two individual charge pumps that are connected in series, the output voltage would depend to a large extent on the generated voltage of the first charge pump.

In accordance with an added mode of the invention, there is the step of applying the boosted output voltage at the bulk terminal of the output Series pass transistor by way of the level shifter.

In accordance with an additional mode of the invention, there is the step of driving a gate terminal of the output series pass transistor using an additional level shifter and a capacitor of the two-stage charge pump.

In accordance with a further mode of the invention, there is the step of applying double the value of the boosted output voltage at the gate terminal of the output series pass transistor.

In accordance with another mode of the invention, there is the step of using the input voltage from an electronic circuit.

In the integrated circuit, it is advantageous that the switches, i.e. the switching transistors and/or the capacitors, are disposed at least partly in isolated wells of the substrate. They are thus separated from neighboring elements with respect to potential and can be wired like discrete components.

Field effect transistors that are constructed as isolated NFET transistors are preferably utilized as the switches. They are situated in an isolated well and can be controlled via the bulk terminal, so that the bulk can be higher than 0 volts.

The circuit layout is simplified by driving the gate terminal of a transistor with a level shifter. In particular, additional capacitors that would otherwise take up a relatively large amount of chip space can be spared this way. Besides this, the bulk can be driven, and consequently a smaller transistor width is sufficient.

With the foregoing and other objects in view there is provided, in accordance with the invention, an integrated circuit. The integrated circuit contains a two-stage charge pump for transforming an input voltage into a boosted output voltage. The two-stage charge pump includes an output capacitor, and an output series pass transistor connected to and charging the output capacitor and the boosted output voltage being available at the output capacitor. The output series pass transistor has a bulk terminal. At least one level shifter is provided and has an output connected to the bulk terminal of the output series pass transistor for driving the bulk terminal.

In accordance with an added feature of the invention, the level shifter applies a value of the boosted output voltage to the bulk terminal of the output series pass transistor.

In accordance with an additional feature of the invention, the output series pass transistor has a gate terminal, the two-stage charge pump has a capacitor, and the two-stage charge pump includes an additional level shifter having an output coupled to the gate terminal of the output series pass transistor through the capacitor for driving the gate terminal.

In accordance with a further feature of the invention, the additional level shifter applies double the value of the boosted output voltage to the gate terminal of the output series pass transistor through the capacitor.

In accordance with another feature of the invention, a substrate having isolated wells formed therein is provided. The two-stage charge pump has capacitors disposed at least partly in the isolated wells of the substrate. In addition, the two-stage charge pump has switches, and the switches and the output series pass transistor are disposed at least partly in the isolated wells of the substrate.

In accordance with concomitant feature of the invention, the two-stage charge pump has switches constructed as switching transistors. More specifically, the switching transistors are field effect transistors or N-type FETs.

Other features which are considered as characteristic for the invention are set forth in the appended claims.

Although the invention is illustrated and described herein as embodied in a method and an integrated circuit for boosting a voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an exemplifying embodiment for boosting a voltage according to the invention; and FIG. 4 is a voltage diagram pertaining to the exemplifying embodiment.

DESCRIPTION OF THE PREFERRED EMBODIMENTS

Figure 1:
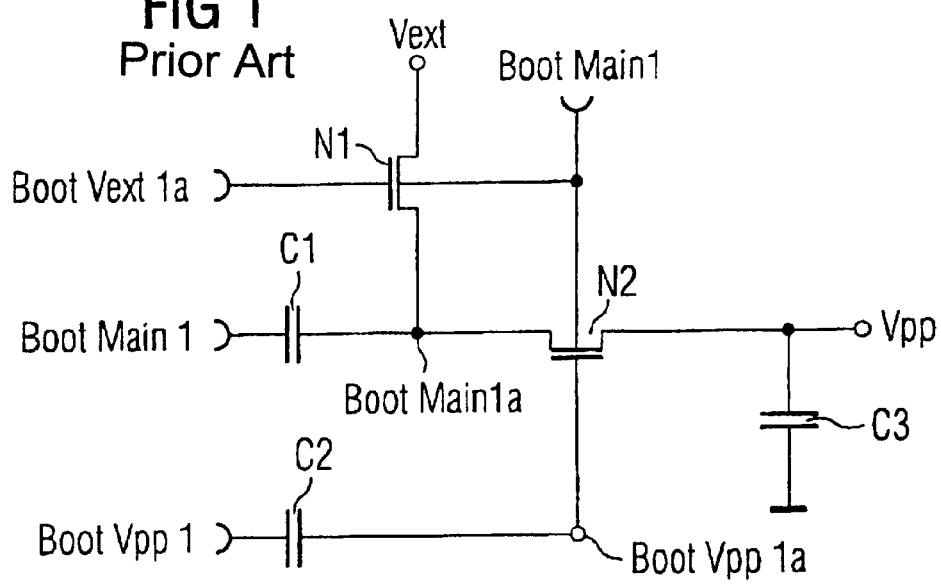
FIG. 1 is a circuit configuration for boosting a voltage of a known charge pump.
Figure 2:
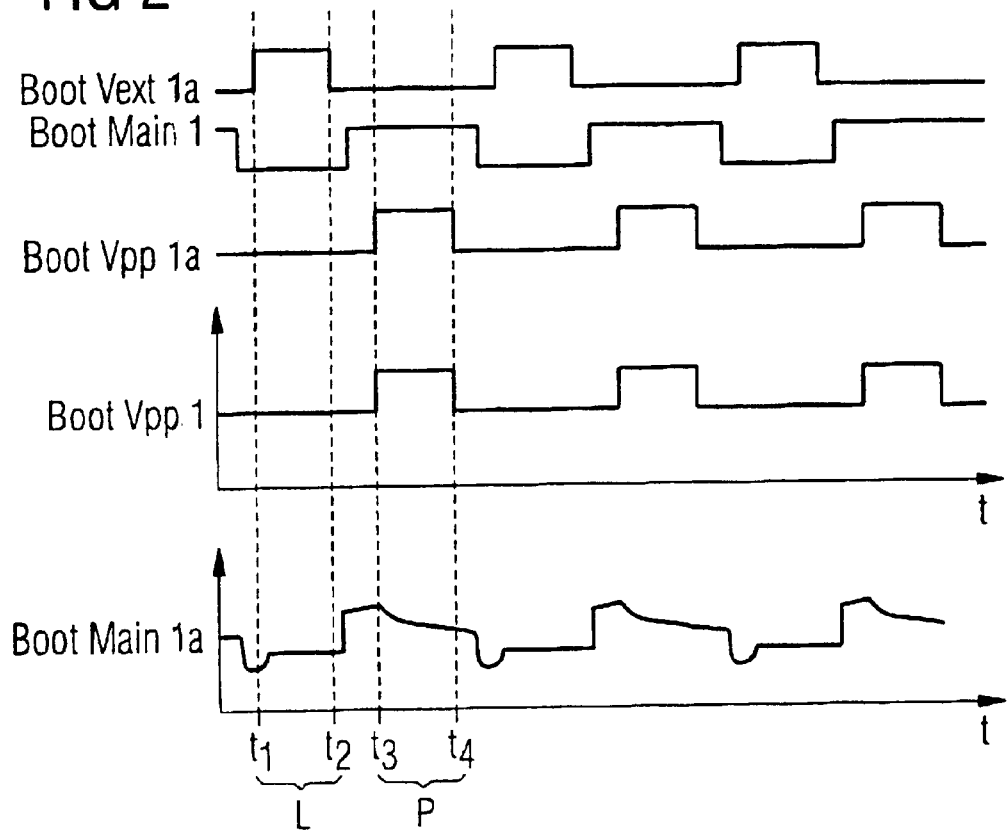
FIG. 2 is a diagram with corresponding voltage curves corresponding to FIG. 1.

Referring now to the figures of the drawing in detail and first, particularly, to FIGS. 1 and 2 thereof, there is shown a construction and operating mode of a known circuit configuration with a charge pump. As represented in FIG. 1, a D.C. voltage (hereinafter, input voltage Vext) is to be transformed into a higher output voltage Vpp, which can also be used as a D.C. voltage. First, the schematically represented circuit configuration has a first capacitor C1, which is connected to a first series pass transistor N2 by way of a node BootMain1a. The transistor N2 is connected on an output side to a grounded load-side capacitor C3, at whose terminal the boosted output voltage Vpp can be tapped. The second terminal of the first capacitor C1 forms the terminal BootMain1 via which the potential is raised or lowered. This process constitutes the pumping. A gate of the first series pass transistor N2 is connected to a second capacitor C2, which is pumped via a terminal BootVpp1. C2 is charged via a transistor that is not represented.

Besides this, a first switch N1 is connected to the node BootMain1a, via which the input voltage Vext can be switched onto the node BootMain1a. The capacitor C1 can be charged via switch N1. On the other end, the capacitor C1 can be discharged via the first series pass transistor N2. The first switch N1 is controlled via a terminal BootVext1a.

The three terminals BootVext1a, BootMain1 and BootVpp1 are control inputs that are controlled in accordance with the voltage diagrams of FIG. 2 by a control that is not represented. The precise function will be described later in connection with FIG. 2.

The circuit configuration is integrated as an integrated circuit in MOS technology, whereby the transistors N1, N2 functioning as switches are expediently NFET transistors. They are respectively disposed in an isolated well of the substrate and have a bulk terminal which is connected to the terminal BootMain1, as is evident from FIG. 1. The capacitors C1, C2 and C3 are likewise disposed in isolated wells of the substrate.

The operating mode of the circuit configuration will now be described. The charge pump works in two phases: a charging phase L and a pumping phase P. In the charging phase L, which contains time periods from t1 to t2 in FIG. 2, the first capacitor C1 is charged to the input voltage Vext by way of the first switch N1, which is driven by BootVext1a, in accordance with the top diagram in FIG. 2. The first series pass transistor N2 is non-conducting in this phase. BootMain1 and BootVpp1 are at 0 volts in this phase.

Between the two phases, the charging phase L and the pumping phase P, whereby P includes the time period from t3 to t4, the two transistors N1 and N2 are non-conducting. After the phase L, in the period from t2 to t3, the terminal BootMain1 is switched from 0 volts to the input voltage Vext, as can be seen in the second diagram of FIG. 2. The node BootMain1*a* is thereby raised to double the value of the input voltage Vext, as represented in the bottom diagram.

In the pumping phase P, i.e. during the interval from t3 to t4, the first series pass transistor N2 is switched through. In order to minimize its ON resistance, a control voltage at the gate terminal is raised above the source voltage, in this case Vpp, by significantly more than a threshold voltage. For this purpose, the node BootVpp1*a*, which has been precharged to Vpp, is raised to Vpp+Vext. This is achieved in that the terminal BootVpp1 is switched from 0 volts to Vext. This is represented in diagrams 3 and 4 of FIG. 2.

After the required gate voltage for the first series pass transistor N2 is achieved, the charge stored in the first capacitor C1, Q1=C1*(2*Vext−Vpp), flows into the downstream capacitor C3 and raises the voltage Vpp at the node by the difference voltage ΔV=Q1/C3. Due to the raising of the voltage at the bulk terminal of the first series pass transistor N2 to the input voltage Vext, the effective threshold voltage is smaller, since the bulk effect is reduced.

The bottom diagram of the FIG. 2 shows the corresponding voltage curve at the node BootMain1*a*. After time t4, the process repeats, as represented in the subsequent portions of the diagram. A voltage doubling can be accomplished with this circuit configuration under the given conditions.

In the inventive exemplifying embodiment of FIG. 3, the two-stage pump is based on the same principle as above. Furthermore, the same signals are utilized for driving, so that for practical purposes the former driver unit can be utilized. However, the driving of a second series pass transistor N4 is modified, with two level shifters 1, 2 being utilized here.

As represented in FIG. 3, the left part of the circuit configuration corresponds in substance to that of FIG. 1. However, a first level shifter 1 has been interposed between the terminal BootVpp1 and the second capacitor C2. Level shifters are responsible for optimally adjusting the voltage levels. The structure of a level shifter is known per se and will not be described here.

The above-described circuit has been inventively expanded as a two-stage charge pump by the parts described below. Between the output of the first series pass transistor N2 and the input of the load-side capacitor C3, a switching transistor N3 is connected at a node BootMain1*b*. The switching transistor N3 can thus switch the capacitor C3 to ground. A gate of the switching transistor N3 is controlled by way of a terminal BootVext1.

The second terminal of the downstream capacitor C3 is now no longer grounded, but is instead connected to the second series pass transistor N4 at a node BootMain1*c*, the output of the transistor N4 is connected to an output capacitor C4. The boosted output voltage Vpp can be tapped at this node. The second terminal of the output capacitor C4 is set at ground.

FIG. 3 further represents how an additional switch N5 is connected to the node BootMain1*c*, via which the input voltage Vext can be switched for the purpose of charging the downstream capacitor C3. Its gate is controlled via a terminal BootVext1*a*. As with the first switch N1, the bulk terminal is likewise connected to the terminal BootMain1, so that the same signals can be utilized here also.

As mentioned above, the unique feature of the circuit configuration is that the gates of the first series pass transistor N2 and of the second series pass transistor N4 are driven by the first level shifter 1 by way of the second capacitor C2. Moreover, it can be provided that the bulk terminal B of the transistor N4 is connected to an output of a second level shifter 2. Both of the level shifters 1, 2 are thus controlled by way of the terminals BootVpp1. This advantageously achieves the minimizing of the ON resistance of the second series pass transistor N4, so that the maximum voltage Vpp sets in at the output capacitor C4.

By way of elaboration, it should be noted that the circuit configuration is constructed as an integrated circuit on a semiconductor chip, expediently in metal oxide semiconductor (MOS) technology. The transistors and capacitors are at least partly disposed in isolated wells of the substrate. The transistors are N-type YET transistors (field effect transistors).

The operating mode of the circuit configuration will now be described in connection with FIGS. 3 and 4. The charge pump is configured to approximately triple the input voltage Vext and also works in two phases, charging and pumping.

In the charging phase L, the two capacitors C1 and C3 are charged to a voltage Vext via the two switches N1, N5, respectively, during the period from t1 to t2. The top curve of FIG. 4 represents the corresponding voltage curve at the terminal BootVext1*a*. During this phase, the switching transistor N3 is also switched to conduct, so that BootMain1*b* is drawn to 0 volts. The two series pass transistors N2, N4 are non-conducting. The corresponding voltage curves are derivable from the other curves in FIG. 4.

In the interval from t2 to t3 between the two phases L and P, all the transistors are non-conducting. The terminal BootMain1 is raised from 0 volts to the voltage Vext during this time. This raises the voltage at the node BootMain1*a* from Vext to 2*Vext.

In the subsequent pumping phase P, the two series pass transistors N2 and N4 are activated and therefore conducting, while the remaining transistors are switched to non-conducting.

This initially raises the node BootMain1*b* to the voltage of node BootMain1*a*, i.e. to the value 2*Vext. As a result, the voltage at the node BootMain1*c* rises to the value 3*Vext. The charges of the two capacitors C1 and C3 are then transferred to the output capacitor C4 via the second series pass transistor N4 and can then be tapped as output voltage Vpp.

In order to minimize the on resistance of the two series pass transistors N2, N4, it is provided that the gate voltages be raised above the source voltage by appreciably more than a threshold voltage, respectively. This is important and relatively difficult to achieve primarily for the second series pass transistor N4. In particular, the problem arises that, given a reduced or low input voltage Vext, the drive voltage—which is Vpp+Vext, as with a single-stage charge pump—is not sufficient in this case for switching through the second series pass transistor N4.

A physical solution would be to substantially widen the second series pass transistor N4. But the disadvantage of this is that the second capacitor C2 and its driver for the terminal BootVpp1 would have to be correspondingly expanded.

For this reason, in an alternative development of the invention, the first level shifter 1 has been inserted between the terminal BootVpp1 and the second capacitor 2. The output of the first level shifter 1 is raised from Vext to Vpp. The node BootVpp1*a*, which was precharged to the voltage Vpp during the charging phase L, is thereby raised to a value of 2*Vpp during the pumping phase P. This efficiently switches through the second series pass transistor N4.

Alternatively, it is further provided that a bulk effect of the transistor N4 be reduced by switching the output of the second level shifter 2, which is controlled by the voltage BootVpp1, onto the bulk terminal B. The bulk terminal B thus achieves the value of the output voltage Vpp, i.e. the source voltage. The bulk source voltage thus becomes 0 volts. The generated voltage Vpp itself is thus used to drive the second series pass transistor N4.

I claim:

1. A method for boosting an input voltage, which comprises the steps of:

impressing the input voltage on a two-stage charge pump during a charging phase resulting in a stored input voltage;

transforming the stored input voltage into a boosted output voltage during a pumping phase, the boosted output voltage being charged by way of an output series pass transistor and tapped at an output capacitor;

using a first level shifter of the two-stage charge pump for driving a bulk terminal of the output series pass transistor; and using a second level shifter and a capacitor of the two-stage charge pump for driving a gate terminal of the output series pass transistor by applying double the value of the boosted output voltage at the gate terminal of the output series pass transistor.

2. The method according to claim 1, which comprises applying a value of the boosted output voltage at the bulk terminal of the output sereies pass transistor by way of the first level shifter.

3. The method according to claim 1, which comprises using the input voltage from an electronic circuit.

4. An integrated circuit, comprising:

a two-stage charge pump for transforming an input voltage into a boosted output voltage, said two-stage charge pump including:

an output capacitor;

an output series pass transistor connected to and charging said output capacitor and the boosted output voltage being available at said output capacitor, said output series pass transistor having a bulk terminal and a gate terminal;

a first level shifter having an output connected to said bulk terminal of said output series pass transistor for driving said bulk terminal;

a capacitor; and an additional level shifter having an output coupled to said gate terminal of said output series pass transistor through said capacitor for driving said gate terminal.

5. The integrated circuit according to claim 4, wherein said first level shifter applies a value of the boosted output voltage to said bulk terminal of said output series pass transistor.

6. The integrated circuit according to claim 4, wherein said additional level shifter applies double the value of the boosted output voltage to said gate terminal of said output series pass transistor through said capacitor.

7. The integrated circuit according to claim 4, wherein said two-stage charge pump includes switches constructed as switching transistors connected to said output series pass transistor.

8. The integrated circuit according to claim 7, wherein said switching transistors are field effect transistors.

9. The integrated circuit according to claim 7, wherein said switching transistors are N-type transistors.

\* \* \* \* \*